Figure 1:
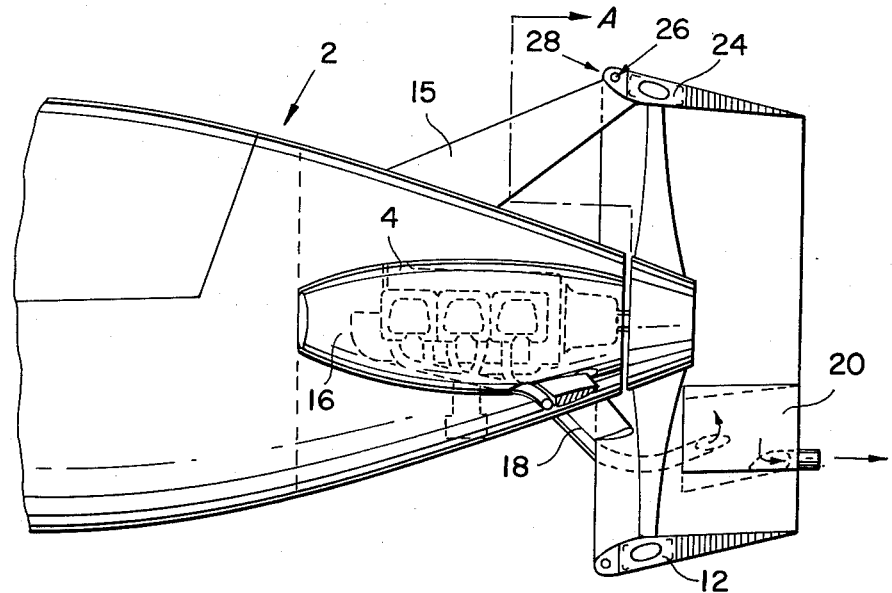

United States Patent [19]

Zimmer et al.

[11] 3,968,944
[45] July 13, 1976

[54] AIRCRAFT WITH SHROUDED PROPELLER DRIVE

[75] Inventors: Friedhelm Zimmer, Markdorf; Zimmer Herbert, Friedrichshafen, both of Germany

[73] Assignee: Dornier GmbH, Germany

[22] Filed: Feb. 27, 1975

[21] Appl. No.: 553,611

[30] Foreign Application Priority Data

May 31, 1974  Germany............................ 2426628

[52] U.S. Cl. .............................. 244/1 N; 60/226 R; 60/269; 115/42; 181/33 HB; 244/34 A; 244/65

[51] Int. Cl.² .......................................... B64D 33/06

[58] Field of Search ............... 244/65, 67, 69, 34 A, 244/1 N; 60/39.5, 226 R, 269; 416/189, 191; 181/39, 36 D, 33 H, 33 HB; 115/14, 11, 12, 42

[56] References Cited

UNITED STATES PATENTS

| 2,504,137 | 4/1950 | Lewis | 244/65 |
|---|---|---|---|
| 2,888,001 | 5/1959 | Morrish | 181/36 D |
| 2,907,536 | 10/1959 | Zborowski | 416/189 |
| 2,998,700 | 9/1961 | Chaplin | 60/269 |
| 3,105,353 | 10/1963 | Schulz | 115/14 |
| 3,113,634 | 12/1963 | Watters | 181/33 HB |
| 3,230,702 | 1/1966 | Soulez-Lariuiere et al. | 60/269 |
| 3,302,404 | 2/1967 | Gist | 60/269 |
| 3,672,169 | 6/1972 | Ufer | 60/226 R |

*Primary Examiner*—Trygve M. Blix
*Assistant Examiner*—Galen L. Barefoot
*Attorney, Agent, or Firm*—James E. Bryan

[57] ABSTRACT

This invention relates to an improvement in an aircraft having a tail-mounted, shrouded pusher-type propeller and an engine mounted in front of the shroud, the improvement comprising exhaust pipe running from the engine to the shroud.

1 Claim, 3 Drawing Figures

AIRCRAFT WITH SHROUDED PROPELLER DRIVE

AIRCRAFT WITH SHROUDED PROPELLER DRIVE

The invention relates to an aircraft with a shroud, at the fuselage tail, for a rotatable pusher-type propeller which is driven by an engine installed in front of the shroud, in the direction of flight.

A shrouded propeller is a known type of drive for aircraft which already has been used for different purposes. Its characteristic of producing a considerably higher static thrust than a free propeller with the same diameter and capacity makes it interesting for VSTOL use. While cruising (Mach < 0.6) it is somewhat inferior to a free propeller due to the resistance of the shroud. This, and the additional weight of the shroud, are the reasons why the shrouded propeller has been used very little to date.

In the case of small and medium sized aircraft, the shrouded propeller as a driving element offers advantages due to its compact construction. When the shrouded propeller operates as a pusher propeller arrangement in a slowed down airstream flowing along the fuselage, then this has aerodynamic advantages; moreover, the passenger comfort (noise, sight) is improved. The smaller shrouded propeller can rotate faster than a free propeller. Since the reduction gear can be eliminated, the additional weight of the shroud is partially compensated.

In the case of a pusher propeller arrangement (for instance Cessna XMC, 337 Skymaster), the exhaust gas jets pass through the propeller circle and are interrupted with the passage of each blade whereby additional noise (siren effect) develops.

It is the object of the invention to create a drive for small and medium sized aircraft which develops less noise with the same flight performances and which makes it possible to meet future, more stringent noise regulations for private and business aircraft.

In the case of an aircraft with a shroud, arranged at the fuselage tail, for a rotatable pusher-type propeller which is driven by an engine installed in front of the shroud in the direction of flight, this object is obtained in accordance with the present invention in such a way that exhaust gas pipe lines lead from the engine to the shroud, and the shroud is designed as a sound absorber.

In a further advantageous design of this invention, separate sound absorbers for individual cylinders or cylinder groups of the engine are installed within or at the shroud.

The arrangement of the sound absorbers in accordance with this invention offers, besides the advantages of the shrouded propeller drive (small diameter, great static thrust, good installation efficiency), the advantage that the engine exhaust gas is led around the propeller and that the spar depth of the propeller shroud is utilized to accommodate exhaust gas sound absorbers. Since much space is available, effective and easily accessible sound absorbers can be installed which, themselves, form part of the propeller shroud. In comparison with present conventional installations for the exhaust gas sound absorption, there is obviously a greater weight to be taken into consideration which, however, is within a reasonable limit in view of the reduced environmental impact. Additional air resistance or a siren effect are definitely avoided.

In accordance with the invention, it is, furthermore, of advantage if the exhaust gas lines are in direct contact with areas of the struts in the shroud so that a de-icing of these structural elements is possible. This also can be achieved by a design in which the exhaust gas pipe lines are installed into the struts of the shroud.

Figure 2:
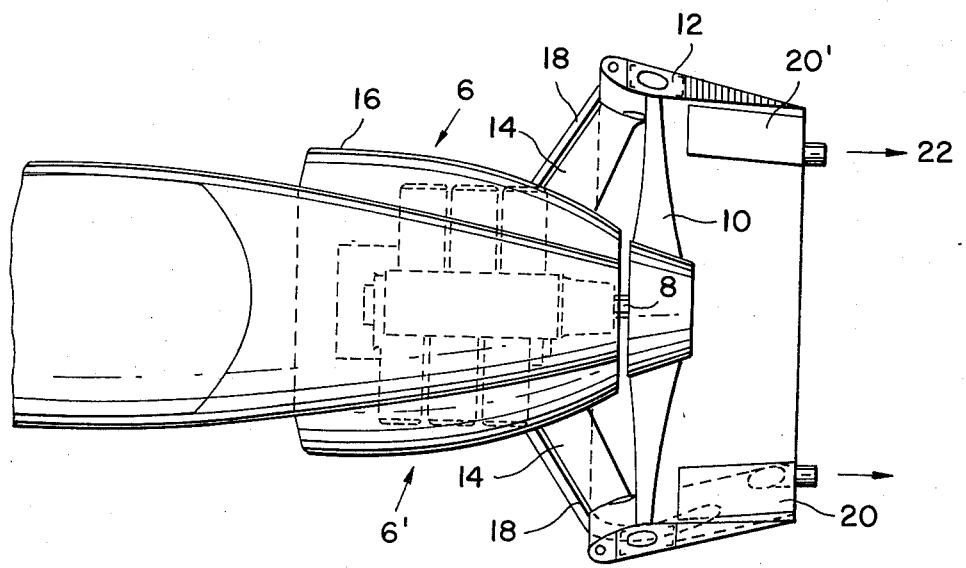
Figure 3:
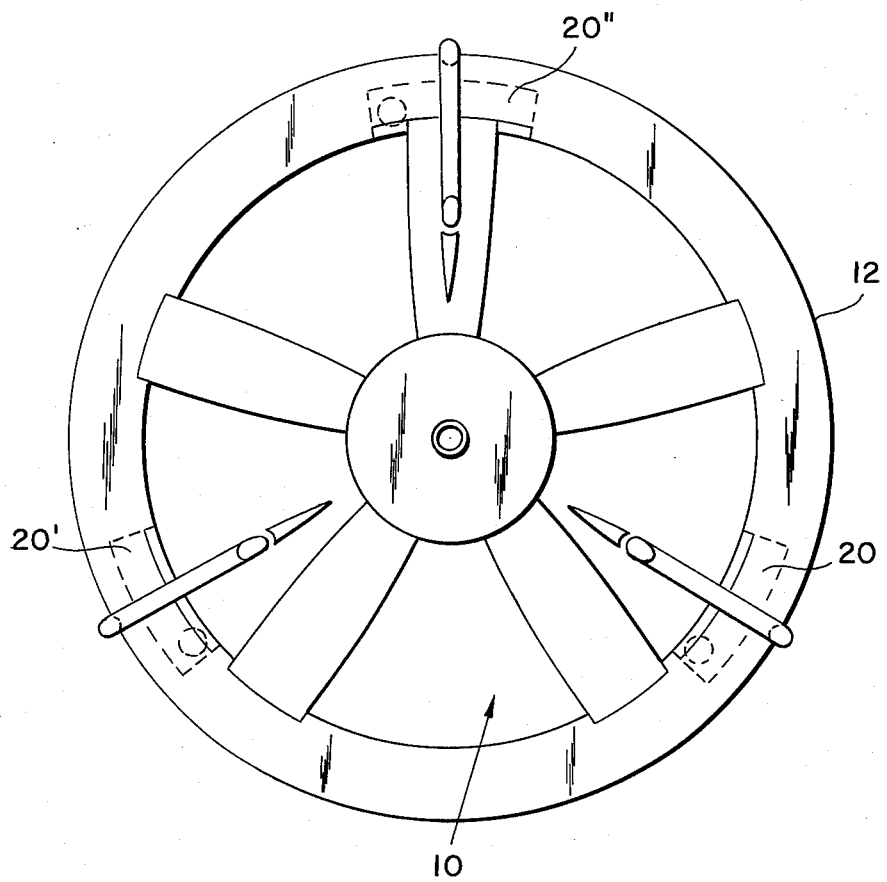

Further advantages, characteristics and possibilities of application are apparent from the accompanying drawings, in which:

FIG. 1 is a partially sectional side view of a drive at the fuselage tail of an aircraft with a shrouded pusher-type propeller, FIG. 2 is a top view of the drive of FIG. 1, and FIG. 3 is a front view of FIGS. 1 and 2 taken on section A of FIG. 1.

FIGS. 1 and 2 show a fuselage tail 2 of an aircraft of known design. Fuselage, aircraft wings and tail unit are not shown; they are designed in known manner and are no part of this invention. An engine 4 installed in the fuselage tail 2 is shown in FIG. 1 in a side view and in FIG. 2 in a top view. It has two cylinder groups 6 and 6' which consist of three cylinders each in the example illustrated. A pusher-type propeller 10 is directly driven by means of a crankshaft 8 in the engine. This pusher-type propeller is within a shroud 12 which is attached to the fuselage of the aircraft by means of the struts 14 and 15.

As can be clearly seen from FIG. 2, the engine 4 is provided with a fairing 16. The cylinder groups 6 and 6' have exhaust gas pipe lines 18 and 18' which run along the struts 14 and 15 to the shroud 12. There they run outside around the shroud 12 and from the outside into the sound absorbers 20 and 20'. The sound absorbers are behind the pusher-type propeller 10 in the direction of flight so that the exhaust gas 22 discharging therefrom can freely flow into the open without having to pass through the propeller and cause an undesired siren effect.

In another design in accordance with the present invention, not shown, the inner space 24 of the shroud 12 also can be constructed as a sound absorber.

FIG. 3 shows a front view of the driving unit of the aircraft (section A) which, in this case, is provided with three sound absorbers 20. In this example, the exhaust gas pipe lines of always two cylinders of the cylinder groups 6 and 6' are combined and each runs to a sound absorber 20, 20' and 20''.

As can be noted from the drawings, the shroud 12 reduces the sound level of the pusher-type propeller 10. Additionally, sound absorbing devices can be installed on the inner side of the shroud 12. De-icing of the shroud 12 (for licensing of the aircraft for instrument flying conditions) is possible by utilizing the heat of the exhaust gas. Part of the exhaust gas can be led from the sound absorbers 20 and 20' to a circular pipe line 26 in the nose 28 of the shroud 12. The struts 14 and 15 also can be independently de-iced if their leading edges are formed by the exhaust gas pipe lines 18 and 18'.

It will be obvious to those skilled in the art that many modifications may be made within the scope of the present invention without departing from the spirit thereof, and the invention includes all such modifications.

What is claimed is:

1. In an aircraft having a tail-mounted, shrouded pusher-type propeller and an engine mounted in front of the shroud, the improvement comprising exhaust pipe means running from said engine to said shroud,
said shroud having sound absorbing means therein including a plurality of means connected to individual cylinders or cylinder groups, and said exhaust pipe means forming the leading edges of struts supporting said shroud and being connected to a circular pipe line in the nose of the shroud.

* * * * *

UNITED STATES PATENT AND TRADEMARK OFFICE
CERTIFICATE OF CORRECTION

PATENT NO. : 3,968,944
DATED : July 13, 1976
INVENTOR(S) : Friedhelm Zimmer and Herbert Zimmer It is certified that error appears in the above-identified patent and that said Letters Patent are hereby corrected as shown below:

Cover page, item [75], line 2 thereof, the second inventor's name should read - - - Herbert Zimmer - - -.

Signed and Sealed this

Twenty-first Day of September 1976

[SEAL]

Attest:

RUTH C. MASON
*Attesting Officer*

C. MARSHALL DANN
*Commissioner of Patents and Trademarks*